US008818179B1

(12) United States Patent
Barton

(10) Patent No.: US 8,818,179 B1
(45) Date of Patent: Aug. 26, 2014

(54) SHARED DVR PROGRAMMING VIA A WEB PAGE

(75) Inventor: James M. Barton, Alviso, CA (US)

(73) Assignee: TiVo Inc., Alviso, CA (US)

(*) Notice: Subject to any disclaimer, the term of this patent is extended or adjusted under 35 U.S.C. 154(b) by 752 days.

(21) Appl. No.: 12/270,493

(22) Filed: Nov. 13, 2008

(51) Int. Cl.
*H04N 5/76* (2006.01)

(52) U.S. Cl.
USPC .......................................... 386/297

(58) Field of Classification Search
CPC ........... H04N 5/00; H04N 9/00; H04N 13/00; H04N 21/00; G06F 17/30572; G06Q 30/00
See application file for complete search history.

(56) References Cited

U.S. PATENT DOCUMENTS

| | | | |
|---|---|---|---|
| 6,642,939 B1 | 11/2003 | Vallone et al. | |
| 7,870,264 B2 | 1/2011 | Clark et al. | |
| 7,877,765 B2 | 1/2011 | Bhogal et al. | |
| 7,933,950 B1 * | 4/2011 | Barton et al. | 709/203 |
| 2002/0083459 A1 | 6/2002 | Kondo et al. | |
| 2002/0174430 A1 | 11/2002 | Ellis et al. | |
| 2003/0110503 A1 | 6/2003 | Perkes | |
| 2003/0118014 A1 | 6/2003 | Iyer et al. | |
| 2003/0145323 A1 | 7/2003 | Hendricks et al. | |
| 2004/0117483 A1 | 6/2004 | Singer et al. | |
| 2004/0237100 A1 | 11/2004 | Pinder et al. | |
| 2004/0261093 A1 | 12/2004 | Rebaud et al. | |
| 2005/0066362 A1 | 3/2005 | Rambo | |
| 2005/0076359 A1 | 4/2005 | Pierson et al. | |
| 2005/0108769 A1 * | 5/2005 | Arnold et al. | 725/115 |
| 2005/0149481 A1 | 7/2005 | Hesselink et al. | |
| 2007/0033617 A1 | 2/2007 | Bloebaum | |
| 2007/0061724 A1 * | 3/2007 | Slothouber et al. | 715/716 |
| 2007/0156805 A1 | 7/2007 | Bristol et al. | |
| 2007/0157237 A1 | 7/2007 | Cordray et al. | |
| 2007/0186269 A1 | 8/2007 | Malik | |
| 2007/0255809 A1 | 11/2007 | Chiba | |
| 2007/0277201 A1 * | 11/2007 | Wong et al. | 725/40 |
| 2008/0002951 A1 * | 1/2008 | Russ et al. | 386/124 |
| 2008/0092168 A1 | 4/2008 | Logan et al. | |
| 2008/0294998 A1 * | 11/2008 | Pyhalammi et al. | 715/748 |
| 2009/0172551 A1 * | 7/2009 | Kane et al. | 715/733 |
| 2009/0241160 A1 | 9/2009 | Campagna et al. | |
| 2010/0031296 A1 | 2/2010 | Elias et al. | |
| 2010/0229197 A1 * | 9/2010 | Yi et al. | 725/40 |
| 2011/0179139 A1 * | 7/2011 | Starkenburg et al. | 709/217 |
| 2011/0283318 A1 * | 11/2011 | Seidel et al. | 725/39 |

FOREIGN PATENT DOCUMENTS

| | | |
|---|---|---|
| JP | 2004/193920 | 7/2007 |
| WO | WO 01/53963 | 7/2001 |

OTHER PUBLICATIONS

Japanese Action received in Application No. 2007-543364, dated Nov. 15, 2011 (4 pages).
Claims in Japanese Application No. 2007-543364, dated Nov. 2011 (9 pages).

(Continued)

*Primary Examiner* — Huy T Nguyen
(74) *Attorney, Agent, or Firm* — Hickman Palermo Truong Becker Bingham Wong LLP; Kirk D. Wong

(57) ABSTRACT

Techniques for shared DVR programming via a web page enable using a DVR widget in a web page and DVR environment on a network to view DVR content from a publisher's DVR usage data and based on the viewed DVR content from the publisher's DVR, record or schedule to record particular content on the viewer's DVR.

24 Claims, 8 Drawing Sheets

(56) References Cited

OTHER PUBLICATIONS

Chinese Office Action received in Application No. 200580041645.9, dated Nov. 24, 2011 (9 pages).
Claims of Chinese Application No. 200580041645.9, dated Nov. 2011 (11 pages).
Office Action received in European application No. 11182065.0, dated Dec. 16, 2011 (9 pages).
Claims of European application No. 11182065.0 dated Dec. 2011 (3 pages).
Bray, T. et al., "Namespaces in XML 1.0 (Second Edition)" downloaded from the Internet on Nov. 26, 2007 < http://www.w3.org/TR/REC-xml-names/ > Aug. 16, 2006 (10 pages).
Bray, T. et al., Extensible Markup Language (XML) 1.0 (Fourth Edition) downloaded from the Internet on Nov. 26, 2007 < http://www.w3.org/TR/REC-xml/ > Sep. 29, 2006 (33 pages).
Day, M. et al., "Instant Messaging/Presence Protocol Requirements" downloaded from the Internet on Nov. 26, 2007 < ftp://ftp.isi.edu/in-notes/rfc2779.txt > Feb. 2000 (25 pages).
Saint-Andre, P., "Extensible Messaging and Presence Protocol (XMPP): Core" downloaded from the Internet on Nov. 26, 2007 < ftp://ftp.isi.edu/in-notes/rfc3920.txt > Oct. 2004 (85 pages).
Saint-Andre, P., "Extensible Messaging and Presence Protocol (XMPP): Instant Messaging and Presence" downloaded from the Internet on Nov. 26, 2007 < http://www.xmpp.org/rfcs/rfc3921.html > 2004 (84 pages).

* cited by examiner

SHARED DVR PROGRAMMING VIA A WEB PAGE

CROSS-REFERENCE TO RELATED APPLICATIONS

This Non-Provisional application is related to U.S. patent application Ser. No. 12/347,897 entitled, "Real-Time DVR Programming," filed Dec. 31, 2008, which is incorporated by reference in its entirety as if fully set forth herein.

FIELD OF TECHNOLOGY

The present invention relates to digital video recorders ("DVRs"). The invention relates more specifically to shared DVR programming via a web page.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the Digital Video Recorder (DVR) to the consumer world has revolutionized the way viewers watch and record television programs. DVRs eliminate the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals as input from cables or satellite dishes, (or, in some cases, unlike VCRs, from broadband network connections) and also output television signals to a television set or other display.

At least one such DVR automatically records several television programs in advance of the time that a user will watch those television programs. After one or more television programs have been recorded and stored on a hard drive, the DVR presents, to the user, through the television set, a user interface that identifies the television programs which currently are available for viewing. This user interface comprises a menu that allows the user to select, using a remote control device for the DVR, one of the currently recorded television programs. In DVRs produced by TiVo Inc., this menu is often called the "now playing" menu.

After a user selects a recorded television program, the DVR plays the selected television program to the user by reading the appropriate digital recording from the hard drive and sending a corresponding signal to the television set. While the television program is being played to the user, the DVR also receives signals from the user's remote control. Through the remote control, a user may instruct the DVR to perform various operations relative to the television program. For example, the user may instruct the DVR to play the television program backward for a desired period of time ("rewind"). The user may play the television program forward with greater than usual speed ("fast forward"). The user may play the television program forward with slower than usual speed. The user may cause the currently displayed video frame of the television program to be displayed indefinitely ("pause"), or stop the playing of the television program entirely. In this manner, the user may temporally traverse the television program however the user likes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EXAMPLE EMBODIMENTS

A method and apparatus for shared DVR programming via a Web page is described. In the following description, for the purposes of explanation, numerous details are set forth in order to provide a thorough understanding of the present invention. It will be apparent, however, that the present invention may be practiced without such details. In other instances, well-known structures and devices are shown in block diagram form in order to avoid unnecessarily obscuring the present invention.

Structural Overview

Figure 1A:
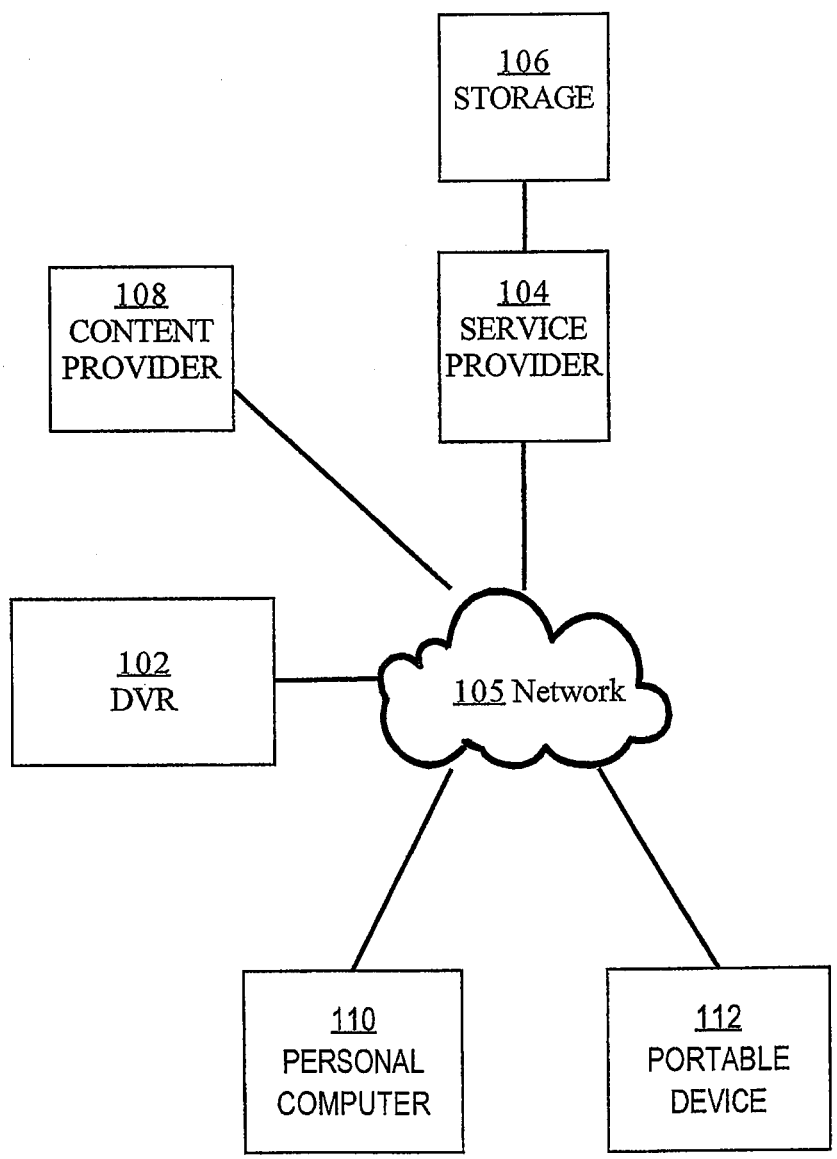
FIG. 1A is a block diagram illustrating a network with content and service providers for a DVR, according to a possible embodiment.

FIG. 1A illustrates a network with content and service providers for a DVR, according to a possible embodiment. The system comprises DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider server ("service provider") 104, storage 106 for service provider 104, content provider 108, personal computer 110 and portable device 112.

Personal computer 110 may be a personal computing device, such as a desktop computer or laptop computer, and is also coupled to network 105 through any communications interface, including wireless. Portable device 112 may be any handheld computing device, cellular phone, portable media player, or any other portable device capable of displaying or playing multimedia content and is also coupled to network 105 through any communications interface, including wireless. DVR 102, personal computer 110, and portable device 112 each communicate as client with service provider server 104 through network 105. In a possible embodiment, DVR 102, personal computer 110, and portable device 112 each communicate with content provider 108 through network 105. Storage 106 may be internal to service provider 104 (not shown) or external to service provider 104 as shown.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In a possible embodiment, content provider 108 provides broadcast program content to DVR 102 via cable, satellite, terrestrial communication, or other transmission method. Broadcast program content may include any multimedia content such as: audio, image, or video content. In a possible embodiment, content provider 108 provides multimedia content, such as any downloadable content, through network 105 to DVR 102, personal computer 110, or portable device 112.

In a possible embodiment, DVR 102 communicates with service provider 104 and storage 106, which provide program guide data, graphical resources (such as fonts, pictures, etc.), service information, software, advertisements, event identification data, and other forms of data that enable DVR 102 to operate independently of service provider 104 to satisfy user interests.

In a possible embodiment, content provider 108 may provide, to service provider 104, content data and/or any metadata, including promotional data, icons, web data, and other information. Service provider 104 may then interpret the metadata and provide the content data and/or metadata to DVR 102, personal computer 110, or portable device 112.

Figure 1B:
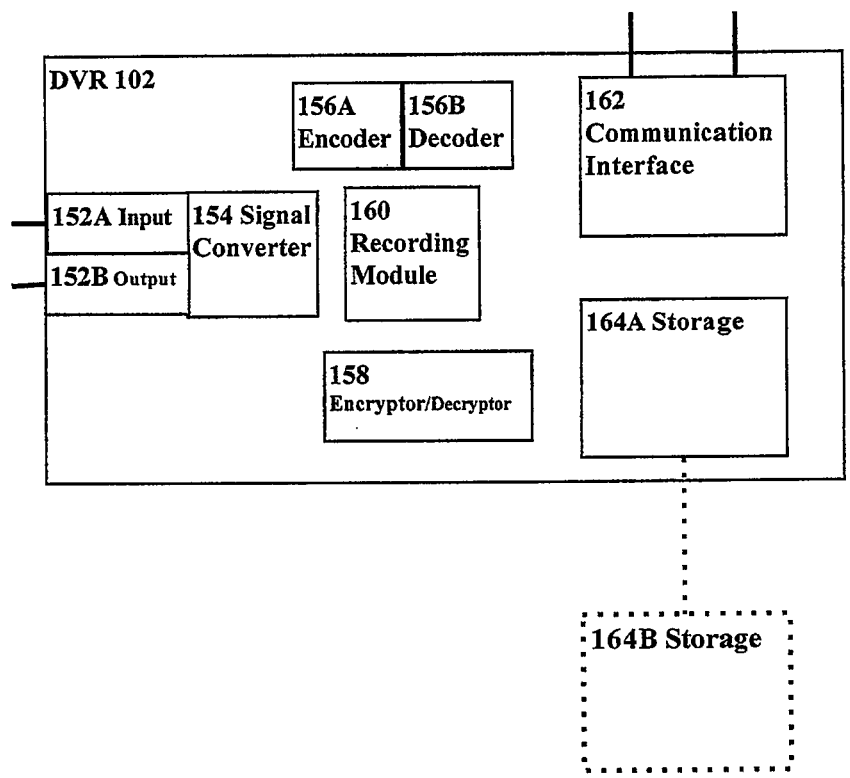
FIG. 1B is a block diagram illustrating a general overview of the components of a Digital Video Recorder (DVR), according to a possible embodiment.

Referring to FIG. 1B, in a possible embodiment, DVR 102 generally comprises one or more components, signified by signal converter 154, that may be used to digitize an analog television signal and convert it into a digital data stream or accept a digital data stream. An example of the internal structure and operation of a DVR is further described in U.S. Pat. No. 6,233,389.

DVR 102 receives broadcast signals from an antenna, from a cable TV system, satellite receiver, etc., via input 152A. Input 152A may comprise one or more tuning modules that allow one or more signals to be received and recorded simultaneously. For example, a TV input stream received by input 152A may take the form of a National Television Standards Committee (NTSC) compliant signal or a Phase Alternating Line (PAL) compliant broadcast signal. For another example, a TV input stream received by input 152A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 152A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 152A and passed to the other modules as if the signals had been delivered via an MPEG-2 private data channel.

Recording module 160 records the incoming data stream by storing the digital data stream on at least one storage facility, signified by storage 164A/164B that is designed to retain segments of the digital data stream. Storage 164A/164B may be one or more non-volatile storage devices (e.g., hard disk, solid state drive, USB external hard drive, USB external memory stick, USB external solid state drive, network accessible storage device, etc.) that are internal 164A and/or external 164B. A signal converter 154 retrieves segments of the data stream, converts the data stream into an analog signal, and then modulates the signal onto a RF carrier, via output 152B, through which the signal is delivered to a standard TV set. Output 152B may alternatively deliver a digital signal to a TV set or video monitor with signal converter 154, converting the data stream into an appropriate digital signal. For example, DVR 102 may utilize a High-Definition Multimedia Interface (HDMI) for sending digital signals to a TV via a HDMI cable.

DVR 102 also includes a communication interface 162, through which the DVR 102 communicates with network 105 via Ethernet, wireless network, modem, or other communications standard. Further, DVR 102 may be integrated into a TV system such that the components described above are housed in a TV set capable of performing the functions of each component of DVR 102.

In another embodiment, DVR 102 generally comprises one or more components necessary to receive, record, store, transfer and playback digital data signals from one or more sources, such as a PC, a DVR, a service provider, or content server. DVR 102 can transfer digital data signals to another DVR or PC. DVR 102 may encode or decode digital signals via encoder 156A and decoder 156B into one or more formats for playback, storage or transfer. According to one embodiment, encoder 156A produces MPEG streams. According to another embodiment, encoder 156A produces streams that are encoded using a different codec. Decoder 156B decodes the streams encoded by encoder 156A or streams that are stored in the format in which the streams were received using an appropriate decoder. DVR 102 can also encrypt or decrypt digital data signals using encryptor/decryptor 158 for storage, transfer or playback of the digital data signals.

In one embodiment, DVR 102 communicates with service provider 104, which provides program guide data, graphical resources such as brand icons and pictures, service information, software programs, advertisements, and other forms of data that enable DVR 102 to operate independently of the service provider 104 to perform autonomous recording functions. Communication between DVR 102 and service provider 104 may use a secure distribution architecture to transfer data between the DVR 102 and the service provider 104 such that both the service data and the user's privacy are protected.

DVR Synchronization with Service Provider by Polling

A possible embodiment of DVR synchronization with service provider 104 by polling may be described with respect to FIG. 1A and FIG. 1B. Storage 164A/164B of DVR 102 comprises program guide data, season pass data, wish list data, now playing data, to do data (e.g., what programs are scheduled), suggestions data, etc. Storage 106 of service provider 104 also comprises a copy of such data for DVR 102. For example, storage 106 comprises one or more databases, which comprise tables that are associated with DVR 102. As well, storage 106 comprises copies of all other DVR clients (e.g., as data stored in tables associated with each of the other DVR clients), which service provider 104 supports and with which service provider 104 communicates (not shown.) DVR 102 periodically establishes a Secure Sockets Layer (SSL) connection to and contacts ("polls") service provider 104 to initiate synchronization between data stored in storage 164A/164B of DVR 102 and data stored in storage 106 of service provider 104. Synchronization between data stored in storage 164A/164B of DVR 102 and data stored in storage 106 of service provider 104 as used herein means causing at least a portion of data stored in storage 164A/164B and at least a portion of data stored in storage 106 to represent the same content. For example, in a possible embodiment, DVR 102 contacts service provider 104 via network 105 to synchronize every fifteen minutes. In a possible embodiment, synchronization is achieved by DVR 102 contacting service provider 104 and sending a subset of local data in storage 164A/164B, e.g., data that reflects updates to the local data stored in storage 164A/164B, to service provider 104 that stores the data on storage 106. In another example, a viewer, from the viewer's PC 110, adds a new season pass for a series, such as The War, to the viewer's collection of season passes. In this example, the viewer, from the viewer's PC 110, adds the new season pass for the series by causing PC 110 to send data related to adding the season pass to service provider 104, which then stores the data in the appropriate table(s) associated with the viewer's DVR 102 in the database on storage 106. When DVR 102 initiates synchronizing data with service provider 104, data reflecting the newly added season pass contained in storage 106 is sent to DVR 102. It should be appreciated that DVR/service provider synchronization is not limited by which element (e.g., DVR 102 or service provider 104) initiates synchronization and sends updated data to the receiving element. For example, DVR 102 may initiate synchronization or service provider 104 may initiate synchronization.

An example DVR/service provider synchronization process is as follows. A user is logged onto the Internet (e.g., network 105) using personal computer 110. For example, the user is navigating the TiVo Central™ Online web page via his browser and, from the TiVo Central™ Online remote scheduling facility, schedules a program to record on the user's DVR 102. The message to record the program gets sent from the web page interface on personal computer 110 to service provider 104. The program information is added to the database tables associated with the user's DVR 102 by service provider 104, e.g., on storage 106 comprising data that represents the schedule of programs for user's DVR 102. The next time that DVR 102 and service provider 104 synchronize data, data reflecting the schedule with the added program is sent by service provider 104 from storage 106 to DVR storage 164A/164B. DVR 102 is thus configured to record the added program according to the user's request.

Instant Message Protocol

Figure 2A:
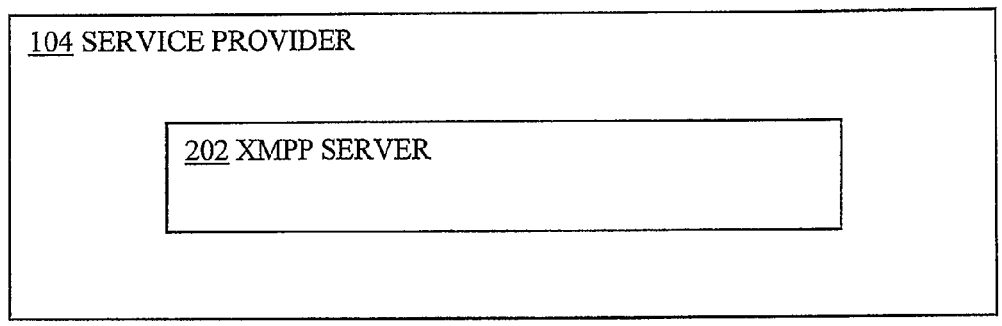
FIG. 2A is a block diagram illustrating service provider comprising an XMPP server internally, according to a possible embodiment.
Figure 2B:
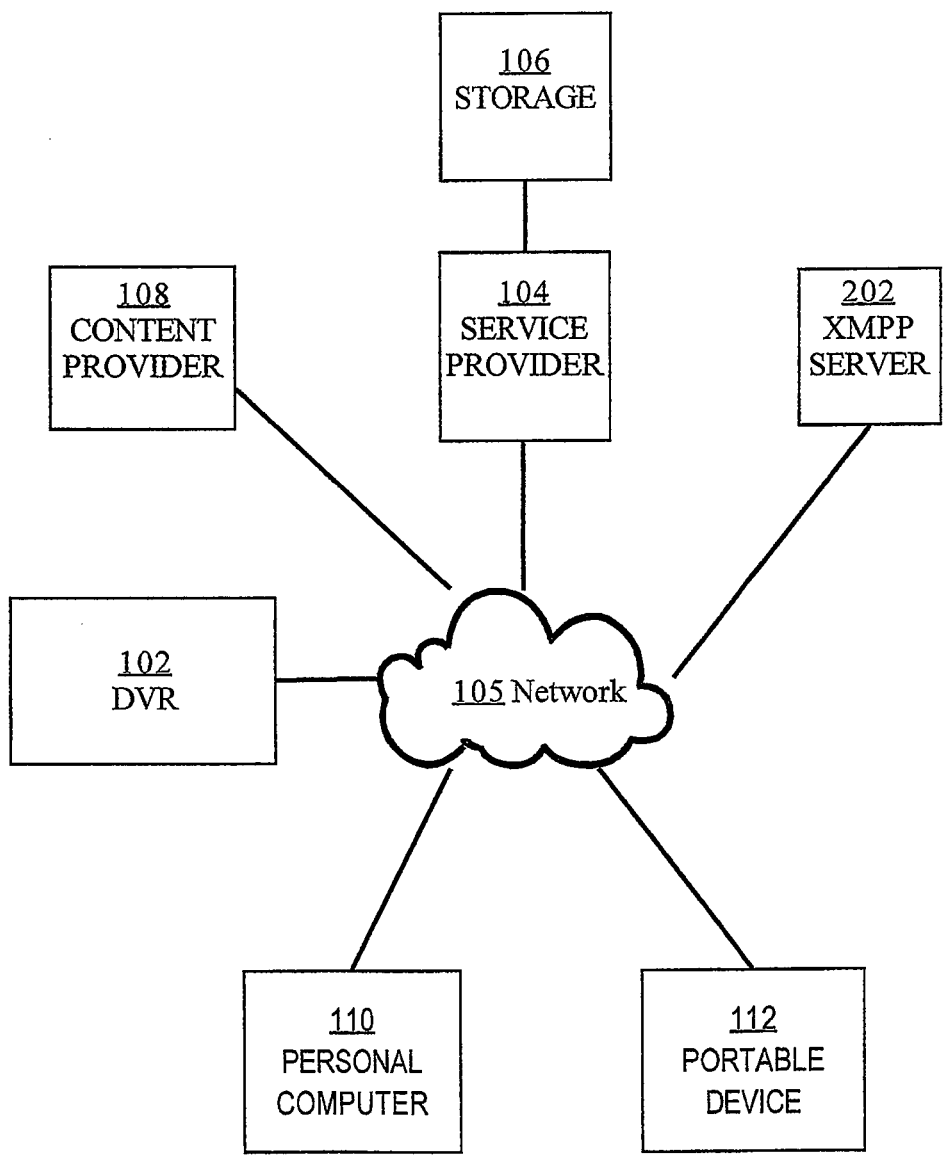
FIG. 2B is a block diagram illustrating XMPP server residing externally to service provider, according to a possible embodiment.

In a possible embodiment, DVR 102, personal computer 110, portable device 112, or any other appropriately configured device, may communicate with service provider 104 on network 105 using a secure client-server instant message protocol to transfer data between DVR 102, personal computer 110, portable device 112, or any other appropriately configured device and service provider 104 such that both the service data and the user's privacy are protected. In a possible embodiment, data may be transferred using secure client-server instant message communications protocol over network 105 via wired, wireless, or any other communication interface. In a possible embodiment, DVR 102 receives and sends instant messages through communication interface 162. As an example, on a cell phone, a user might select a program to be recorded and the request to record the program is sent as an instant message to service provider 104. Instant message communication between DVR 102, personal computer 110, or portable device 112 and service provider may be described with reference to FIG. 2A and FIG. 2B. FIG. 2A is a block diagram of service provider 104 comprising an Extensible Messaging and Presence Protocol (XMPP) server 202 internally. In a possible embodiment, XMPP server 202 is communicatively connected to network 105 and external to service provider 104, as shown in FIG. 2B. It should be appreciated that in a possible embodiment, any system configured for instant message communications protocol may be contemplated and that any embodiment described herein using XMPP is meant by way of example and is not meant to be limiting. For example AOL Instant Messenger (AIM®), Microsoft's Windows Live, ICQ®, or Short Messaging Services (SMS) are each a system that may be used for instant message communications protocol in accordance with one or more embodiments. In a possible embodiment, commands from any of DVR 102, personal computer 110, or portable device 112 are sent via network 105 to service provider 104 as instant messages. After receipt of such instant messages, service provider 104 updates appropriate database tables in storage 106 that are associated with the user associated with the command. As an example, in a possible embodiment, after receipt of one or more instant messages containing information relating to a particular update to a user's DVR, service provider 104 updates appropriate database objects in central site database 100, as described in the commonly owned U.S. Pat. No. 6,728,713, titled, "Distributed Database Management System," dated Apr. 27, 2004, which is incorporated herein in its entirety as if fully set forth herein. It should be appreciated that such configurations are by way of example only and are not meant to be limiting.

In a possible embodiment, XMPP is an open source protocol for real-time extensible instant messaging (IM) over a network as well as presence information, such as used for buddy lists. XMPP is based on open standards, similar to email. Similar to a user in an open email environment, a user in an open XMPP environment with a domain name and a suitable Internet connection may run an XMPP server and communicate directly with users on other XMPP servers. An example client XMPP application is Google Talk. Google Talk is a Windows application for Voice over IP and instant messaging, offered by Google, Mountain View, Calif.

An example XMPP message delivery process from UserA to UserB is as follows. UserA sends a message intended for UserB to UserA's XMPP server. If UserB is blocked on UserA's server, then the message is dropped. Otherwise, UserA's XMPP server opens a connection to UserB's XMPP server. A possible embodiment of the opened connection may include obtaining authorization and obtaining an encrypted connection. After the connection is established, UserB's XMPP server checks if UserA is blocked on UserB's XMPP server. If UserA is blocked on UserB's XMPP server, the message is dropped. In a possible embodiment, if UserB is not presently connected to UserB's XMPP server, the message is stored for later delivery. It should be appreciated that other options apply, such as dropping the message. In a possible embodiment, if UserB is presently connected to UserB's XMPP server, the message is delivered to UserB. It should be appreciated that in a possible embodiment, UserA's server and UserB's server are the same server. For instance, UserA sends instant messages to UserB and receives instant messages from UserB by sending messages to and receiving messages from an XMPP server and UserB sends instant messages to UserA and receives messages from UserA by sending messages to and receiving messages from the XMPP server.

Further details on example structure and functionality of XMPP may be found in The Internet Society's "Request For Comment" (RFC) documents RFC3920, "Extensible Messaging and Presence Protocol: Core" and RFC3921, "Extensible Messaging and Presence Protocol: Instant Messaging and Presence."

Instant Message Synchronization

In a possible embodiment, DVR 102 is an instant messaging client and hosts an instant message client application. DVR 102 attempts to maintain an instant messaging connection with instant message XMPP server 202 at all times. Service provider 104 is also an instant messaging client and hosts an instant message client application. As well, service provider 104 attempts to maintain an instant messaging connection with instant message XMPP server 202 at all times. In a possible embodiment, DVR 202, XMPP server 202, and service provider 104 communicate according to open standard XMPP protocol, e.g., as described above. In a possible embodiment, service provider 104 comprises related software that enables service provider 104 to communicate with storage 106. It should be appreciated that in certain contexts herein, references to service provider 104 are used in the collective sense and is meant to include reference to the related software that manages storage 106.

Figure 3A:
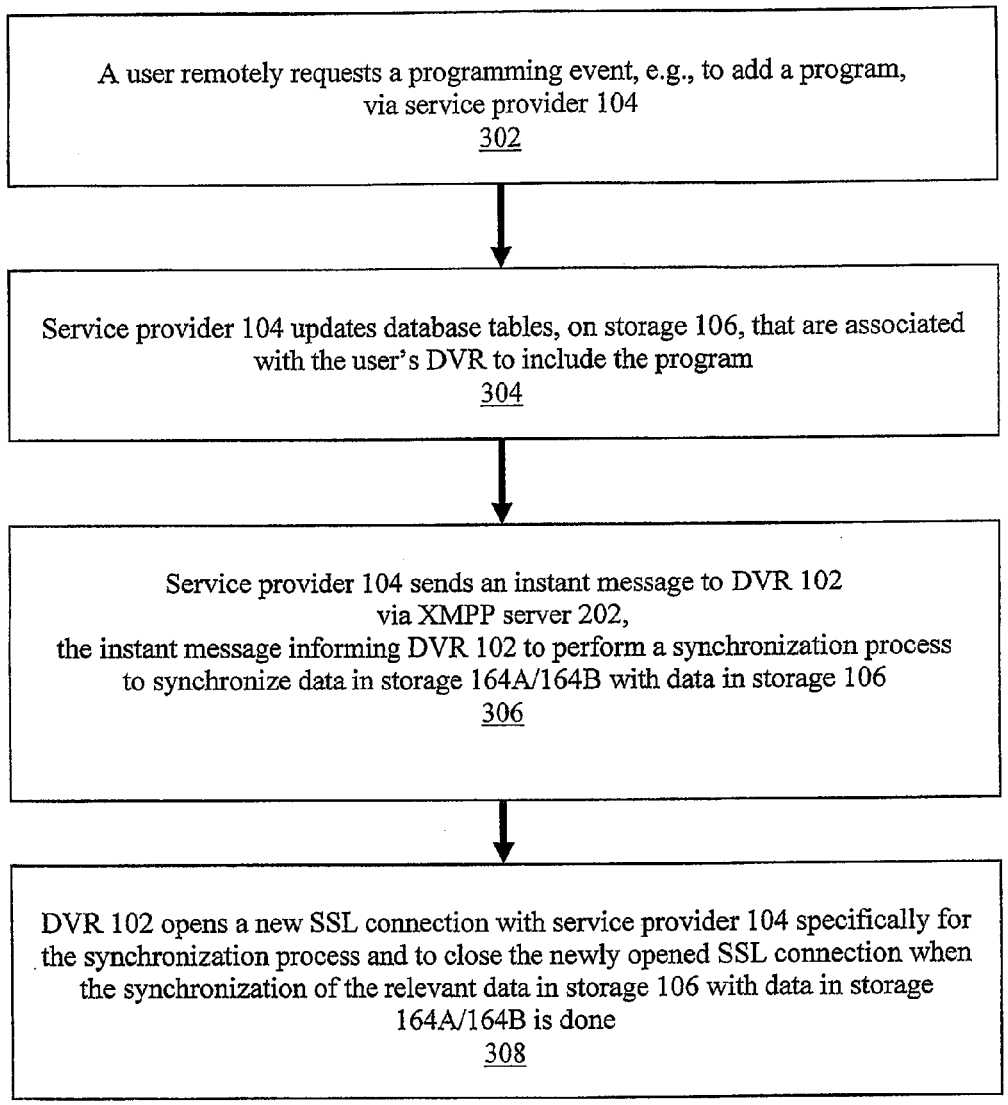
FIG. 3A is a flow diagram showing an example DVR/service provider synchronization process flow, according to a possible embodiment.

A possible embodiment of instant message synchronization may be described with reference to FIG. 3A. FIG. 3A is a flow diagram showing an example DVR/service provider synchronization process flow. This example synchronization process flow begins with a user remotely requesting a programming event, e.g., to add a program, via service provider 104 (Step 302.) For example, PC 110 may request to add a program to the user's schedule of recordings for DVR 102. For example, through PC 110 the user may remotely add a program to record using TiVo Central™ Online through service provider 104. Service provider 104 updates database tables on storage 106 that are associated with the user's DVR to include the program (Step 304.) As well, service provider 104 sends an instant message to DVR 102 via XMPP server 202 (Step 306.) It should be appreciated that, in a possible embodiment, DVR 102 attempts to maintain the connection to XMPP server 202 at all times, reconnecting automatically whenever the connection drops. Similarly, it should be appreciated that, in a possible embodiment, service provider 104 attempts to maintain the connection to XMPP server 202 at all times, reconnecting automatically whenever the connection drops. In either case, when the connection to XMPP server 202 is not up for any reason, the instant message is discarded. In the example, the instant message informs DVR 102 that a change has been made to the database tables that are associated with the user's DVR in storage 106 and requests that DVR 102 synchronize data in storage 164A/164B with data in storage 106. In a possible embodiment, the notification causes DVR 102 to open a new SSL connection with service provider 104 specifically for the synchronization process and to close the newly opened SSL connection when the synchronization of the relevant data in storage 106 with data in storage 164A/164B is done (Step 308.) It should be appreciated that certain details in the example are by way of illustration only and are not meant to be limiting. As an example, while a remote user requests a change via PC 110, the request for change may be sent from any configurable device, such as portable device 112.

Figure 3B:
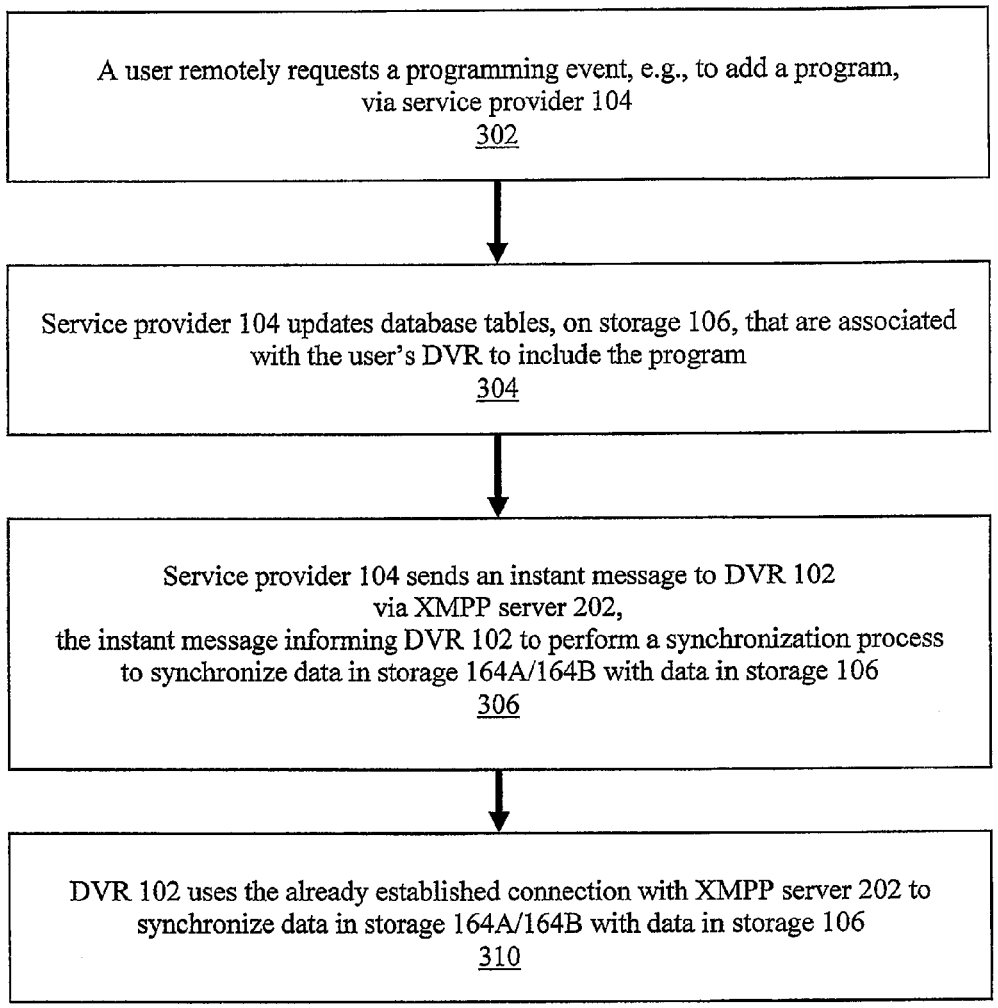
FIG. 3B is a flow diagram showing an example DVR/service provider synchronization process flow, according to a possible embodiment.

Another embodiment of DVR/service provider synchronization may be described with reference to FIG. 3B. FIG. 3B is a flow diagram showing an example DVR/service provider synchronization process flow that is similar to FIG. 3A, however with a different last step. As in FIG. 3A, the example synchronization process flow of FIG. 3B begins with a user remotely requesting a programming event, e.g., to add a program, via service provider 104 (Step 302.) For example, PC 110 requests the service to add a program to the user's schedule of recordings for DVR 102. For example, through PC 110 the user may remotely add a program using TiVo Central™ Online through service provider 104. Service provider 104 updates database tables on storage 106 that are associated with the user's DVR to include the program (Step 304.) As well, service provider 104 sends an instant message to DVR 102 via XMPP server 202 (Step 306.) It should be appreciated that, in a possible embodiment, DVR 102 attempts to maintain the connection to XMPP server 202 at all times, reconnecting automatically whenever the connection drops. Similarly, it should be appreciated that, in a possible embodiment, service provider 104 attempts to maintain the connection to XMPP server 202 at all times, reconnecting automatically whenever the connection drops. In either case, when the connection to XMPP server 202 is not up for any reason, the instant message is discarded. In the example, the instant message informs DVR 102 that a change has been made to the database tables that are associated with the user's DVR in storage 106 and requests that DVR 102 synchronize data in storage 164A/164B with data in storage 106. Responsive to the message, DVR 102 uses the already established connection with XMPP server 202 to pass and/or receive the synchronization data to synchronize data in storage 164A/164B with data in storage 106 (Step 310.) It should be appreciated that certain details in the example are by way of illustration only and are not meant to be limiting. For instance, while, in the example, a remote user requests a change from PC 110, the request for change may be sent from any configurable device, such as portable device 112. It should be appreciated that this approach allows for fast updates of DVR 102. A user may be able to request to record a multimedia content a minute or two before the multimedia content begins and DVR 102 may be updated and record the multimedia content without missing any of the content material.

It should be appreciated that client-server instant message protocol in a DVR environment is not limited to synchronizing schedule-related and recording-related data. Indeed, any type of data stored in storage 106 of service provider 104 may be synchronized with data stored in DVR storage 164A/164B, such as software, electronic program guide data, advertisements, multimedia content, etc. As well, any type of data stored in DVR storage 164A/164B may be synchronized with data stored in storage 106 of service provider 104.

As well, through an instant message connection, data reflecting any type of activity from any client may be sent to the service provider storage on a real-time basis. The type of and use of such gathered data is limitless. For example, the data may be aggregated and analyzed for marketing or towards providing better customer service. As another example, data gathered for a particular user may be used to initiate a customized or targeted process for that particular user, and so forth.

Scalability and Robustness

In a possible embodiment, the DVR attempts to maintain an SSL connection with an XMPP server at all times, reconnecting whenever the connection is dropped. Because the DVR maintains the SSL connection with the XMPP server, the DVR has the capability to use instant messaging at all times, except during those short intervals when the connection is temporarily dropped. For example, the DVR may employ an already established connection with the XMPP server to perform the synchronization with the service provider. Thus, the DVR using the established connection to perform synchronization provides scalability.

In another embodiment, one or more XMPP servers are configured not to store messages that are sent to any of the one or more XMPP servers. For example, an XMPP server receives an XMPP message and passes the XMPP message on to a recipient, such as the DVR, without using additional XMPP server resources for storing the message. Because the one or more XMPP servers may not need to use additional resources to store XMPP messages, more XMPP server resources may be used at a given time for processing more messages, thus providing greater scalability.

In a possible embodiment, DVR/service provider synchronization via instant messaging is robust because the DVR and service provider automatically reconnect after any connection failures during the synchronization process.

In another embodiment, DVR/service provider synchronization is rendered robust by a configuration that uses a combination of DVR/service provider synchronization by polling and DVR/service provider synchronization by instant messaging. For example, an administrator may set DVR/service provider synchronization by polling to operate every twenty-four hours, while DVR/service provider synchronization by instant messaging is operable as well. The combination of synchronization by polling and synchronization by instant messaging renders a robust synchronization feature. For example, suppose that an XMPP server crashes at the time that the XMPP server is attempting to send a message to a DVR, e.g., a request to synchronize, and that the crash causes the sending of the message to fail. In a possible embodiment, the DVR may be updated from the synchronization by the polling process, possibly at a later time. Thus, synchronization is successful and robust even in a case, which may be rare, when an XMPP message is lost.

Shared DVR Programming Via a Web Page

Figure 4:
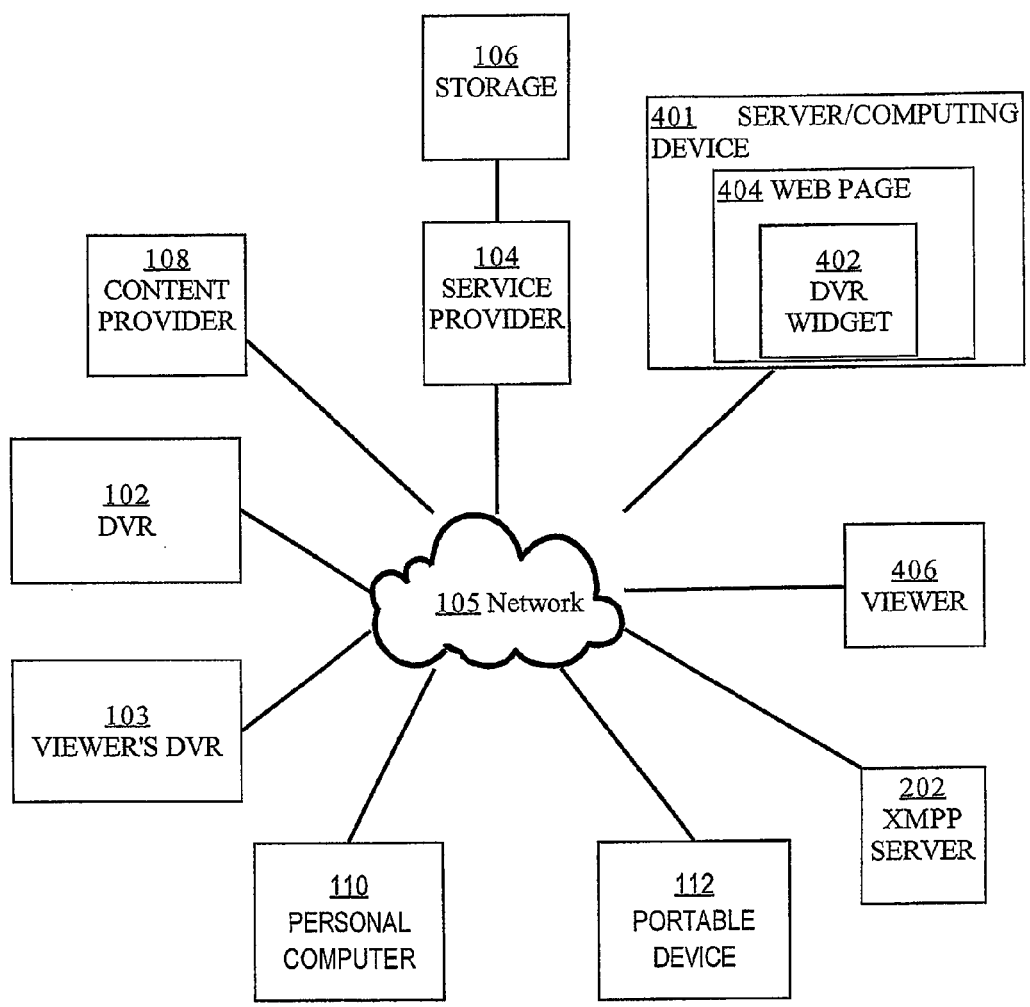
FIG. 4 is a block diagram illustrating components of a system for shared DVR programming via a web page, according to a possible embodiment.

Referring to FIG. 4 and in accordance with a possible embodiment, a personal web page publisher ("publisher") may embed a pre-made DVR web widget 402 ("DVR widget") into the publisher's personal web page 404. A detailed description of widgets can be found below in the section, entitled, "Widgets and Access Control." When the web page opens, code is executed on a server or computing device 401 that causes DVR widget 402 to appear on personal web page 404. When DVR widget 402 is selected (e.g., by placing a cursor over DVR widget 402 and pressing a mouse button) by a viewer 406 on the network, code for DVR widget 402 or code for personal web page 404 containing DVR widget 402 confirms authentication of the viewer (e.g., confirms that the viewer is a friend of the web page publisher and is thus authenticated.) For example, DVR widget 402 or personal web page 404 may request that the viewer inputs identification information that DVR widget 402 or personal web page 404 may use to compare against a list of viewers that are allowed access. In another embodiment, the viewer's identification data for authorization may be stored as a cookie on the viewer's client machine, such that the viewer's identification data for authorization stored in the cookie may save the viewer time and effort from having to enter information, such as the viewer's identification data, in subsequent sessions. As well, DVR widget 402 or personal web page 404 may grant certain permissions to the viewer, with or without using the viewer's identification information. For example, DVR widget 402 or personal web page 404 may grant access to a particular viewer with permissions including allowing the viewer to view the publisher's recorded programs. After establishing that permission is granted or that permission may not be required, DVR widget 402 or web page 404 causes the server or computing device to establish a secure connection (e.g., an SSL connection) over a network (e.g., network 105) to the publisher's DVR (e.g., DVR 102.) In another embodiment, after establishing that permission is granted or that permission may not be required, DVR widget 402 or web page 404 causes a secure connection over network 105 to service provider 104 to be established or uses an established secure connection over network 105 to service provider 104 (e.g., by using a secure client-server instant message protocol.) Service provider 104 then accesses database tables that are associated with the publisher's DVR in storage 106.

After establishing a secure connection over network 105 or using an established secure connection over network 105, DVR widget 402 may request a list of multimedia content ("content list") on DVR 102 to be displayed on DVR widget 402. The display on DVR widget 402 may be populated with informational data ("metadata") about the content on DVR 102 from database tables in storage 106 that are associated with the publisher's DVR. Metadata on DVR 102 may include, but are not limited to, any informational data about the content, e.g. informational data about content that is scheduled to be recorded, informational data about content that is to be automatically recorded, promotional data, icons, or web data. The content list may represent part of or all of the publisher's DVR content in DVR 102. For example, a content list may contain season pass, wishlist, recorded program list, list of programs to be recorded, etc. A season pass is a type of recording that keeps track of a television show that is part of a television series. For example, the service provided by TiVo (TiVo Inc., Alviso, Calif.) records the show every week, even when the day or time of a previous recording of the show changes. Via a season pass, a user may indicate how many shows to store and whether or not to store reruns. A wishlist is a list of one or more content items that a user desires to record or schedule to record to the user's DVR when the content item becomes available. The content list may contain titles of television shows, names of actors or directors, subjects, etc. For example, a user can enter the actor's name, Sidney Poitier, and when a movie or television show that is featuring Sidney Poitier becomes available, then such movie or show is added to the list of content items to be recorded and/or scheduled to be recorded. Then, the DVR subsequently records the movie or show at the scheduled day and time. It should be appreciated that, inn a possible embodiment, the amount and type of metadata sent to DVR widget 402 may be based on permissions granted to the particular viewer.

For example, a publisher of a personal web page on a social network web site, such as on Facebook (Facebook, Palo Alto, Calif.) or on Myspace.com® (myspace.com, Beverly Hills, Calif.) ("myspace") embeds a DVR widget from TiVo. When a viewer (e.g., friend) of the publisher's Facebook or myspace page opens the page, the viewer may see the DVR widget display. Depending upon permissions for the viewer, the viewer may readily see via the DVR widget certain metadata about content lists that are stored or scheduled to be recorded in the publisher's DVR.

In an example, metadata obtained by DVR widget 402 may be displayed on the publisher's personal web page 404 by way of a graphical user interface ("GUI"), such as a list box containing a list of DVR categories, a list of DVR entries, or one or more icons representing DVR categories or entries. The viewer may tab from one list entry to the next or may select a particular list entry (e.g., the Superbowl game) representing, or that is associated with, a particular content item. Selecting a particular list entry may cause DVR widget 402 to display certain metadata related to the particular content that is from the publisher's DVR, such as, for example, full title of the content, duration of the content, and main actors starring in the content, and so forth.

As well, in an example and in accordance with a possible embodiment, the viewer may select a particular entry in DVR widget 402 which may cause a message box to be displayed on top of the publisher's personal web page 404. The message box may ask the viewer whether the viewer would like to record the content (e.g., the Superbowl game) associated with the selected entry and store the recording in the viewer's own DVR storage. If the viewer declines, the message box closes.

In a possible embodiment, a viewer may indicate that the viewer desires to record or to schedule to record a media content, e.g., a video program or recording of music, from the publisher's DVR that is displayed in the publisher's DVR widget. When the viewer indicates that the viewer desires to record or schedule to record the media content from the publisher's DVR that is displayed in the publisher's DVR widget, the viewer is transferred to the viewer's online DVR account through which the viewer is able to record or schedule to record the desired media content. For example, viewer 406 selects an item (e.g., a video program) in a content list that is displayed in publisher's DVR widget 402. The viewer selecting the item in the content list causes a web page containing a login GUI to open in the browser of viewer 406. Viewer 406 logs into the viewer's online DVR account through the login GUI by entering appropriate identification and password information. In addition, when the viewer selects the item in the content list, informational data (e.g. metadata) corresponding to or about the item is received from publisher's DVR widget 402. In a possible embodiment, the received informational data may be temporarily stored, e.g., in the viewer's cache or in a cookie on the viewer's client machine. Thus, when the viewer logs into the viewer's online DVR account, the stored informational data may be used to automatically create a request to search for and find the particular item and to automatically record or schedule to record the particular item, without any more work or active participation by the viewer. For example, viewer 406 logs into viewer's online DVR account, which is created and maintained by service provider 104, and service provider 104 retrieves or receives the stored informational data from the cache of cookie from viewer 406. Having the informational data from the cache or cookie, service provider 104 automatically generates a search request, using the informational data, for storage 106 to receive and use the item's program information from database tables on storage 106 and to automatically record or schedule to record the item, without any more work or active participation by viewer 406. In another embodiment, the informational data about the item may be used by viewer 406 to manually record or manually schedule to record the item using the viewer's online DVR account via service provider 104.

In a possible embodiment, service provider 104 receives a message (e.g., from the viewer's online DVR account) to schedule to record a content item (e.g., such as the item above) and initiates the synchronization process by methods described above. For example, service provider 104 sends a synchronization message to viewer's DVR 102 by any of the methods described above in the sections entitled, DVR SYNCHRONIZATION WITH SERVICE PROVIDER BY POLLING and INSTANT MESSAGE SYNCHRONIZATION.

Widgets and Access Control

A web widget ("widget") is a block of code (e.g., html) that defines a portion of a web page. Typically, the block of code contains JavaScript (JavaScript is a registered trademark of Sun Microsystems, Inc.) JavaScript code allows the widget to render executable code such that the widget can be interactive. An example block of html code is depicted in Table A below:

Table A

```
<html xmlns="http://'any URL'">
    <head>
        <title> Example</title>
        <script type="text/javascript">
            {
            some code;
            }
        </script>
    </head>
    <body>
        some code
    </body>
</html>
```

An example of an online widget service is Widgetbox (Widgetbox, San Francisco, Calif.). Widgetbox is an online service that provides a gallery of ready-made widgets for web publishers, utilities for making a widget for developers, and information about widgets. A web widget may be a small piece of interactive content (e.g., an advertisement or a game) that can be dynamically embedded into a web page. Widgets may be used in blogs, social networks, personal home pages, and web sites, for example. Widgets enable online services to allow viewers and users access to off-domain entities (e.g., DVRs, business applications, etc.)

In a possible embodiment, when a viewer opens the publisher's personal web page, the DVR widget that is associated with the publisher's personal web page causes code to be run which authenticates the viewer. For example, in a possible embodiment, the DVR widget is configured by the publisher with one or more levels of permissions for viewers. Such one or more levels of permissions enable viewers to view, from the publisher's DVR, particular metadata about the publisher's DVR content that is associated with the one or more levels of permission. For example, a publisher with a DVR widget for TiVo may allow all viewers to view informational data that is displayed in the publisher's Now Playing list and Season Pass list, but not information that is displayed in the publisher's Wish List.

In a possible embodiment, the DVR widget is configured such that the publisher may determine which among his viewers are allowed to see the informational data in the DVR account. For example, the publisher may configure the DVR widget such that only his or her friends can see informational data about what content is stored in his TiVo's DVR. As another example, the publisher may configure the DVR widget embedded in his or her Facebook page such that only viewers in the publisher's immediate contacts list may have permission to view the informational data about the content stored in or scheduled to be recorded on the publisher's DVR.

In a possible embodiment, one or more levels of control that are associated with a publisher's DVR account may indicate different actual content to which a viewer may or may not have direct or indirect access.

An Example

Suppose a viewer by the name of John Doe is viewing an opened publisher's page via his computing device and desires to add a Season Pass from the publisher's DVR widget to John Doe's own DVR (e.g., DVR 103.) In an example and in accordance with a possible embodiment, from a GUI that is associated with or embedded in the publisher's DVR widget, John Doe selects an entry that corresponds to the particular desired Season Pass. Selecting a particular entry from the GUI causes a block of code to run that displays text in the same or another GUI asking, "Do you want that Season Pass added for your DVR?" In a possible embodiment, in response to answering affirmatively to the question about wanting to add the Season Pass for John Doe's DVR, John Doe is able to add the Season Pass for one or more particular DVRs in a variety of ways. In a possible embodiment, the Season Pass is automatically added for one or more DVRs. For example and in accordance with a possible embodiment, through a previous activity, John Doe had placed or stored a cookie on John Doe's client device (through which John Doe is viewing the publisher's page and publisher's DVR widget) that contains information about a particular DVR of John Doe. For example, and in accordance with a possible embodiment, John Doe may have stored in such cookie a TiVo service number (TSN) that corresponds on a one-to-one basis with the particular DVR of John Doe. In a possible embodiment, storing such TSN in the cookie serves the purpose of preauthorizing John Doe to automatically login to John Doe's TiVo account. In an alternate embodiment, John Doe is prompted to manually enter a password that corresponds either to the TSN or to the TiVo account. In an alternate example, John Doe may have previously entered two or more TSNs (each TSN corresponding to each of two or more particular DVRs), with particular permissions, into John Doe's online TiVo account with the effect of allowing each of such DVRs to be automatically programmed online via John Doe's TiVo account. Thus, for illustrative purposes, when John Doe selects a Season Pass from the publisher's DVR widget, John Doe is prompted to answer whether John Doe wants to add the Season Pass to a particular DVR. In response to John Doe indicating affirmatively, John Doe's client device is configured to automatically open the cookie and to obtain a TSN, which corresponds to the DVR, from the cookie and to send a message (e.g., via instant message protocol) containing the TSN to service provider 104, the message containing a request to automatically add the Season Pass for the DVR that is associated with the TSN. In an alternate embodiment, in response to John Doe indicating affirmatively that John Doe wants to add the Season Pass for the DVR, John Doe manually logs into John Doe's TiVo account and enters an appropriate id/password to access the TiVo account. At the TiVo account, the TSN may be automatically entered from the cookie or may be manually entered by John Doe. From the TiVo account, a message containing a request to add the Season Pass for John Doe's DVR, the id/password, and the TSN is sent to service provider 104 to add the Season Pass for John Doe's DVR. The Season Pass may be added for John Doe's DVR by a combination of systems and methods described herein.

For example, and in accordance with a possible embodiment, when John Doe selects the Season Pass on the publisher's DVR widget, the DVR widget then allows John Doe to login to his TiVo account and enter one or more TSNs that can be programmed. For instance, such piece of code of the DVR widget takes each TSN and sends a request to service provider 104 that modifies database tables on storage 106 that are associated with John Doe's DVR. In a possible embodiment and as described hereinabove, modifying database tables that are associated with the DVR may initiate a synchronization process. For instance, adding the Season Pass to the database tables on storage 106 generates a message from service provider 104 to John Doe's DVR 103 to initiate the synchronization process. In a possible embodiment, the synchronization process is performed in real-time using one or more XMPP servers in conjunction with over an SSL connection as described hereinabove in the section, INSTANT MESSAGE SYNCHRONIZATION.

Instant Share or Program to Program Transfer

In a possible embodiment, service provider 104 and storage 106 are configured to enable copying a multimedia content item from a first DVR directly to a second DVR. For example, suppose John Doe views the title of a publisher's video program on the publisher's DVR widget and requests such video program to be recorded on John Doe's DVR (e.g., DVR 103.) For example, John Doe selects the title from the publisher's DVR widget. In a possible embodiment, selecting the title from the publisher's DVR widget causes code to execute on service provider 104 which causes metadata in database tables about the video program on the publisher's DVR to be loaded into database tables in storage 106 that are associated with John Doe's DVR. And, as described above, modifying the database tables that are associated with John Doe's DVR may activate the synchronization process, which may result in John Doe's DVR receiving (e.g. recording or downloading) the video program. Thus, John Doe may play the recorded video program on John Doe's DVR after the synchronization process has completed. In a possible embodiment, John Doe and the publisher are members of the same direct marketing association (DMA) and such that such copying does not violate any federal or state regulations.

For example and in accordance with a possible embodiment, a first friend viewing a list on a second friend's DVR widget desires to record or download a particular episode of a television show from the viewed list. The first viewer selects an entry from the list that corresponds to the particular episode. Selecting the entry causes a real-time direct DVR to DVR transfer (e.g. copy of the multimedia content and any related metadata from the second friend's DVR to the first friend's DVR). In a possible embodiment, such direct DVR to DVR transfer had been previously authorized using service provider 104. In another embodiment, a copy of the multimedia content and any related metadata from the second friend's DVR to the first friend's DVR may be through the use of an intermediate storage (e.g. storage 106.)

Devices that can Interface with the Internet

In a possible embodiment, the viewer views the publisher's web page and DVR widget from any device which communicates with the Internet, including wireless communication. For example, the viewer may view the publisher's web page and DVR widget from a cellular phone, personal digital assistant (PDA), etc.

Hardware Overview

Figure 5:
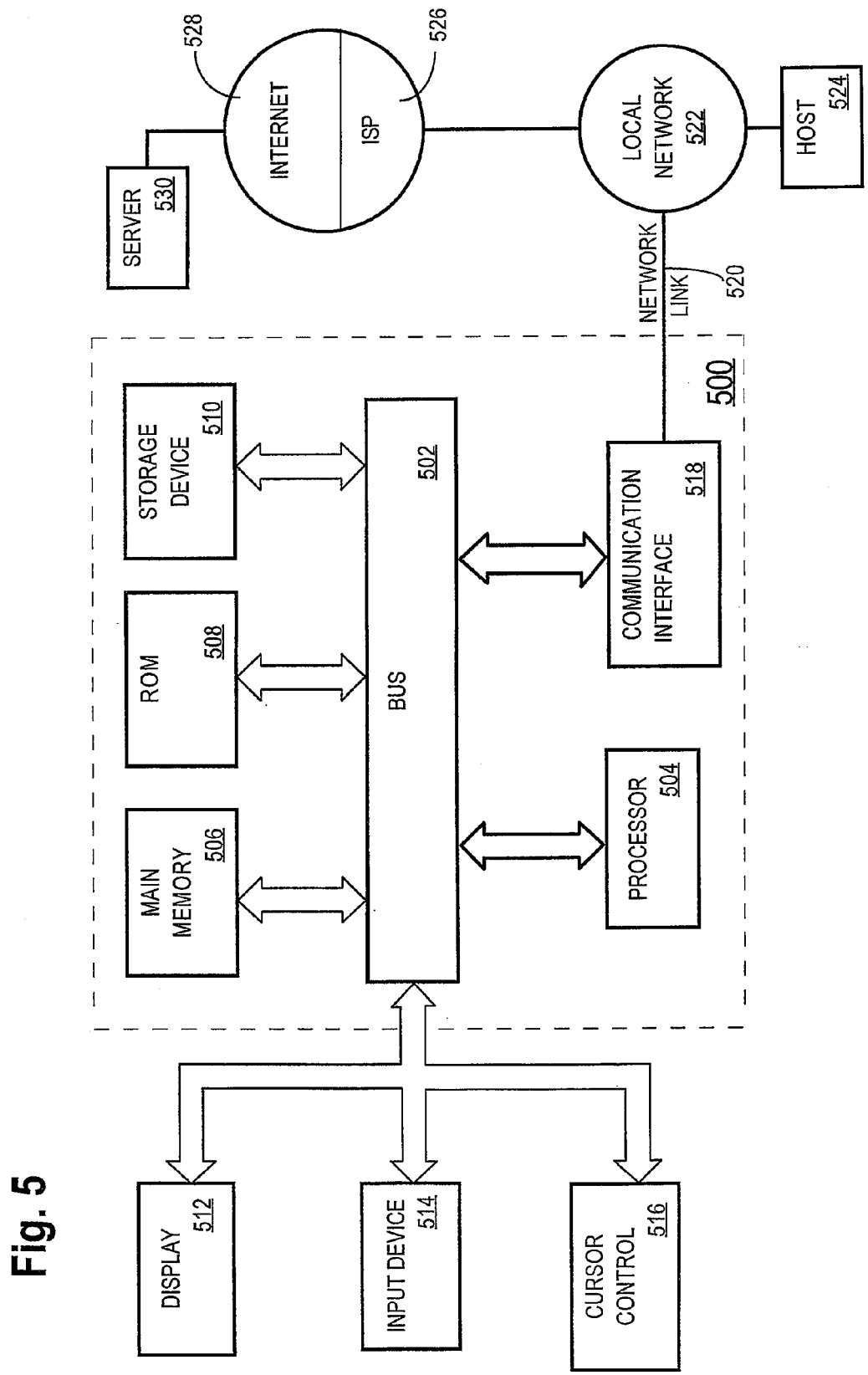
FIG. 5 is a block diagram that illustrates a computer system upon which a possible embodiment may be implemented.

FIG. 5 is a block diagram that illustrates a computer system 500 upon which a possible embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for shared DVR programming via a web page. According to one embodiment of the invention, shared DVR programming via a web page is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for shared DVR programming via a web page as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   receiving, from a device, a selected metadata item selected from a list of one or more selectable metadata items on a first user's web page from a social network web site displayed on the device, the web page comprising code that executes a web widget, execution of the web widget by the device causing display of the list of one or more selectable metadata items, each of the one or more selectable metadata items are associated with one or more content stored or scheduled to be recorded in a first DVR; and
   responsive to receiving, from the device, an indication that the metadata item was selected from the one or more selectable metadata items, automatically sending in real-time across a network a message causing a second DVR to record or schedule to record a content associated with the selected metadata item;
   wherein the method is performed by one or more computing devices.

2. A method as recited in claim 1, wherein the message is an instant message and is sent using instant message communication protocol.

3. A method as recited in claim 1, further comprising:
   prior to execution of the web widget causing the display of the one or more selectable metadata items, authenticating a second user and authorizing the second user for access to the displayed one or more selectable metadata items.

4. A method as recited in claim 1, wherein prior to sending the message, receiving first data that are associated with a second user and second data that are associated with the second DVR, wherein the first data and the second data are used for obtaining access to the second DVR and wherein the first data and the second data are reflected in the message.

5. A method as recited in claim 1, wherein sending the message causing a second DVR to record or schedule to record the content further comprises the step of:
   sending the message to a server coupled to a storage device that stores database tables that are associated with the second DVR;
   wherein the message comprises data that cause the database tables that are associated with the second DVR to be updated to reflect that the content is to be recorded or is scheduled to record and that cause synchronization between the updated database tables and the second DVR.

6. A method as recited in claim 3, further comprising:
   causing data corresponding to authenticating the second user and authorizing the second user to be stored in a cookie.

7. A method as recited in claim 1, wherein causing the second DVR to record further comprises copying the content and metadata that is associated with the content from the first DVR directly to the second DVR.

8. A method as recited in claim 1, wherein causing the second DVR to record further comprises copying the content and metadata that is associated with the content from the first DVR to the second DVR through an intermediate storage device.

9. An apparatus, comprising:
   a web page receiving subsystem that receives from, a device, a selected metadata item selected from a list of one or more selectable metadata items on a first user's web page from a social network web site displayed on the device, the web page comprising code that executes a web widget, execution of the web widget by the device causing display of the list of one or more selectable metadata items, each of the one or more selectable metadata items are associated with one or more content stored or scheduled to be recorded in a first DVR; and
   a sending processor that responsive to receiving, from the device, an indication that the metadata item was selected from the one or more selectable metadata items, automatically sends in real-time across a network a message causing a second DVR to record or schedule to record a content associated with the selected metadata item.

10. An apparatus as recited in claim 9, wherein the message is an instant message and is sent using instant message communication protocol.

11. An apparatus as recited in claim 9, further comprising:
    an authenticating and authorizing subsystem for authenticating a second user and authorizing the second user for access to the displayed one or more selectable metadata items, prior to execution of the web widget causing the display of one or more selectable metadata items.

12. An apparatus as recited in claim 9, wherein prior to sending the message, first data that are associated with a second user and second data that are associated with the second DVR, wherein the first data and the second data are used for obtaining access to the second DVR and wherein the first data and the second data are reflected in the message.

13. An apparatus as recited in claim 9, wherein the sending subsystem is configured to send the message to a server coupled to a storage device that stores database tables that are associated with the second DVR, and wherein the message comprises data that cause the database tables that are associated with the second DVR to be updated to reflect that the content is to be recorded or is scheduled to record and that cause synchronization between the updated database tables and the second DVR.

14. An apparatus as recited in claim 11, wherein the authenticating and authorizing subsystem causes data corresponding to authenticating the second user and authorizing the second user to be stored in a cookie.

15. An apparatus as recited in claim 9, wherein the message comprising data that cause the second DVR to record or schedule to record the content item further comprises data that cause the content and metadata that is associated with the content to be copied from the first DVR directly to the second DVR.

16. An apparatus as recited in claim 9, wherein the message comprising data that cause the second DVR to record or schedule to record the content item further comprises data that cause the content and metadata that is associated with the content to be copied from the first DVR to the second DVR through an intermediate storage device.

17. A non-transitory computer-readable medium storing one or more sequences of instructions, which when executed by one or more processors, cause the one or more processors to carry out the steps of:
    receiving, from a device, a selected metadata item selected from a list of one or more selectable metadata items on a first user's web page from a social network web site displayed on the device, the web page comprising code that executes a web widget, execution of the web widget by the device causing display of the list of one or more selectable metadata items, each of the one or more selectable metadata items are associated with one or more content stored or scheduled to be recorded in a first DVR; and responsive to receiving, from the device, an indication that the metadata item was selected from the one or more selectable metadata items, automatically sending in real-time across a network a message causing a second DVR to record or schedule to record a content associated with the selected metadata item.

18. A non-transitory computer-readable medium as recited in claim 17, wherein the message is an instant message and is sent using instant message communication protocol.

19. A non-transitory computer-readable medium as recited in claim 17, further comprising instructions which when executed cause the one or more processors to carry out the step of:

prior to execution of the web widget causing the display of the one or more selectable metadata items, authenticating a second user and authorizing the second user for access to the displayed one or more selectable metadata items, prior to execution of the web widget causing the display of one or more selectable metadata items.

20. A non-transitory computer-readable medium as recited in claim 17, wherein prior to sending the message, receiving first data that are associated with a second user and second data that are associated with the second DVR, wherein the first data and the second data are used for obtaining access to the second DVR and wherein the first data and the second data are reflected in the message.

21. A non-transitory computer-readable medium as recited in claim 17, wherein the instructions for sending the message further comprise instructions, which when executed cause the one or more processors to carry out the step of:

sending the message to a server coupled to a storage device that stores database tables that are associated with the second DVR;

wherein the message comprises data that cause the database tables that are associated with the second DVR to be updated to reflect that the content is to be recorded or is to be scheduled to record and that cause synchronization between the updated database tables and the second DVR.

22. A non-transitory computer-readable medium as recited in claim 19, further comprising instructions which when executed cause the one or more processors to carry out the step of:

causing data corresponding to authenticating the second user and authorizing the second user to be stored in a cookie.

23. A non-transitory computer-readable medium as recited in claim 17, wherein instructions causing the second DVR to record further comprises instructions, which when executed cause the one or more processors to carry out the step of copying the content and metadata that is associated with the content from the first DVR directly to the second DVR.

24. A non-transitory computer-readable medium as recited in claim 17, wherein instructions causing the second DVR to record further comprises instructions, which when executed cause the one or more processors to carry out the step of copying the content and metadata that is associated with the content from the first DVR to the second DVR through an intermediate storage device.

* * * * *